(12) United States Patent
Sullivan et al.

(10) Patent No.: US 10,402,735 B2
(45) Date of Patent: Sep. 3, 2019

(54) METHODS AND APPARATUS TO IMPROVE DECISION TREE EXECUTION

(71) Applicant: The Nielsen Company (US), LLC, New York, NY (US)

(72) Inventors: Jonathan Sullivan, Natick, MA (US); Michael Sheppard, Brooklyn, NY (US); Peter Lipa, Tucson, AZ (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 790 days.

(21) Appl. No.: 14/862,583

(22) Filed: Sep. 23, 2015

(65) Prior Publication Data

US 2016/0292580 A1 Oct. 6, 2016

Related U.S. Application Data

(60) Provisional application No. 62/140,005, filed on Mar. 30, 2015.

(51) Int. Cl.
*G06N 5/04* (2006.01)
*G06Q 30/02* (2012.01)

(52) U.S. Cl.
CPC ......... *G06N 5/045* (2013.01); *G06Q 30/0242* (2013.01)

(58) Field of Classification Search
CPC combination set(s) only.
See application file for complete search history.

(56) References Cited

U.S. PATENT DOCUMENTS

| 7,328,218 | B2 | 2/2008 | Steinberg et al. |
| 7,499,897 | B2 | 3/2009 | Pinto et al. |
| 7,792,771 | B2 | 9/2010 | Samson et al. |
| 8,065,326 | B2 | 11/2011 | Li et al. |
| 8,181,133 | B2 * | 5/2012 | Gowda ................. G06F 17/504 |
| | | | 716/107 |
| 8,200,693 | B2 | 6/2012 | Steele et al. |
| 8,918,771 | B2 * | 12/2014 | Dunn .................. G06F 9/45516 |
| | | | 717/136 |

(Continued)

OTHER PUBLICATIONS

IEEE Program decision logic optimization using predication and control speculation W.-M.W. Hwu; D.I. August; J.W. Sias Published in: Proceedings of the IEEE ( vol. 89 , Issue: 11 , Nov 2001) pp. 1660-1675 IEEE.*

(Continued)

*Primary Examiner* — Michael B Holmes
(74) *Attorney, Agent, or Firm* — Hanley, Flight & Zimmerman, LLC

(57) ABSTRACT

Methods, apparatus, systems and articles of manufacture are disclosed to improve decision tree execution. An example method includes retrieving, with a processor, a decision tree logic expression in a sum-of-products (SOP) form, the decision tree logic expression consuming a first duration to evaluate a dataset, eliminating, with the processor, redundant variables of the decision tree logic expression by transforming the decision tree logic expression into a product-of-sums (POS) form, and evaluating, with the processor, the data set with the decision tree logic expression in the POS form, the decision tree logic expression in the POS form consuming a second duration to evaluate the data set that is less than the first duration.

27 Claims, 11 Drawing Sheets

BRANCH 1

(56) References Cited

U.S. PATENT DOCUMENTS

| | | | |
|---|---|---|---|
| 9,848,224 B2* | 12/2017 | Sullivan | H04N 21/25883 |
| 9,870,486 B2* | 1/2018 | Sullivan | G06F 16/2457 |
| 9,912,424 B2* | 3/2018 | Sheppard | H04H 60/66 |
| 9,936,255 B2* | 4/2018 | Sheppard | H04N 21/4663 |
| 9,986,272 B1* | 5/2018 | Sheppard | H04N 21/252 |
| 10,089,358 B2* | 10/2018 | Sheppard | G06F 16/24556 |
| 10,091,547 B2* | 10/2018 | Sheppard | H04N 21/44218 |
| 10,127,567 B2* | 11/2018 | Sheppard | G06Q 30/0201 |
| 10,171,103 B1* | 1/2019 | Zevulun | H03M 7/3086 |
| 10,187,675 B2* | 1/2019 | Sheppard | G06F 16/285 |
| 10,200,757 B2* | 2/2019 | Sullivan | H04N 21/4665 |
| 10,244,278 B2* | 3/2019 | Sullivan | H04N 21/252 |
| 10,248,811 B2* | 4/2019 | Sullivan | G06F 16/2457 |
| 2009/0235216 A1* | 9/2009 | Gowda | G06F 17/504 |
| | | | 716/106 |
| 2012/0197608 A1 | 8/2012 | Pinto et al. | |
| 2014/0089908 A1* | 3/2014 | Dunn | G06F 9/45516 |
| | | | 717/151 |
| 2015/0131967 A1 | 5/2015 | Batiz et al. | |

OTHER PUBLICATIONS

European Patent Office, "Communication Pursuant to Article 94(3) EPC," issued in connection with European Patent Application No. 16000739.9, dated Nov. 27, 2017, 5 pages.

Bengio et al., "Decision Trees Do Not Generalize to New Variations," Computational Intelligence, vol. 26, No. 4, 2010 (19 pages).

European Patent Office, "Extended European Search Report," issued in connection with European Patent Application No. 16000739.9, dated Jul. 13, 2016 (8 pages).

National Intellectual Property Administration of China, "Office Action," issued in connection with Chinese Patent Application No. 201610191464.4, dated May 5, 2019, 9 pages.

* cited by examiner

METHODS AND APPARATUS TO IMPROVE DECISION TREE EXECUTION

RELATED APPLICATION

This patent claims the benefit of, and priority to, U.S. Provisional Application Ser. No. 62/140,005, entitled "Surrogate Splitting Optimization" and filed on Mar. 30, 2015, which is hereby incorporated herein by reference in its entirety.

FIELD OF THE DISCLOSURE

This disclosure relates generally to data analysis, and, more particularly, to methods and apparatus to improve decision tree execution.

BACKGROUND

In recent years, social media applications and panelist media consumption behavior applications have grown to produce relatively large quantities of data. Attempts to analyze the data from such applications is aided by decision trees, which include test nodes that analyze a particular variable from the data for a conditional result. For example, if an analyst attempts to obtain a subset of the data related to males less than twenty-five years old, then a first node may analyze the data with a male/female test node to test an inequality expression.

When the male/female test node evaluation results in "TRUE," then the corresponding data points are associated with male panelists. Additionally, the resulting subset of data associated with the male panelists may further proceed to an age test node that tests data points for an inequality of "Less Than 25." When the age test node results in a true statement, then that resulting subset of data points is associated with individuals (e.g., panelists) that are both male and less than twenty-five years old.

DETAILED DESCRIPTION

Figure 1A:
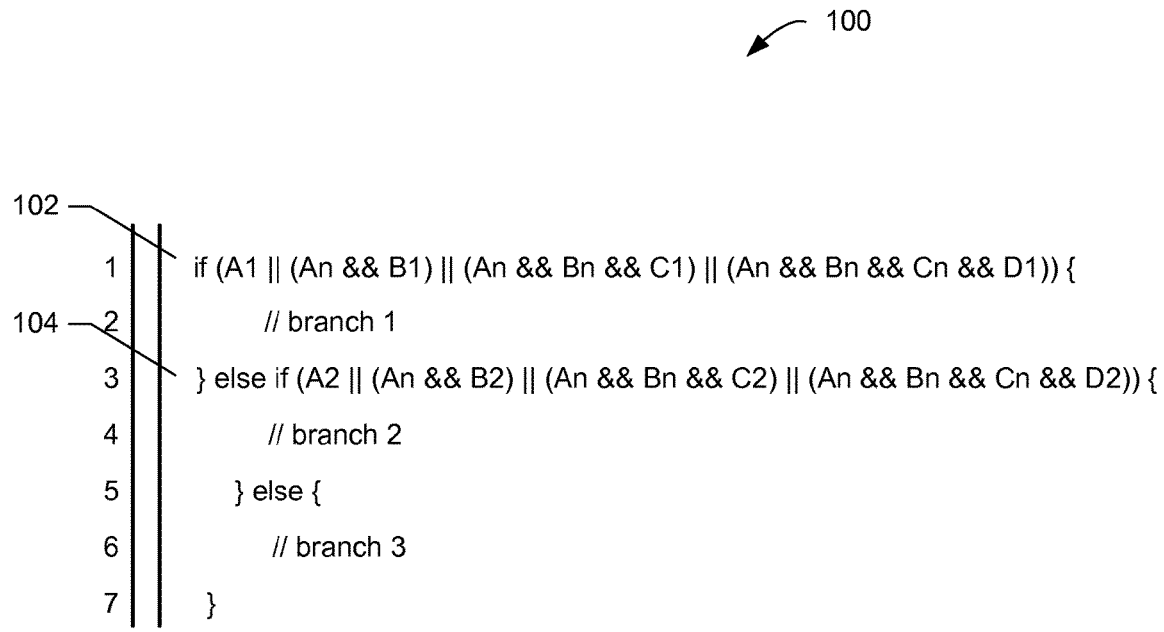
FIG. 1A is a portion of example decision trees in disjunctive normal form.

Decision trees may be used with data analysis related to any number and/or type of application, such as set-top-box data analysis, online campaign ratings data analysis and/or social media data analysis. Decision trees include methodologies, techniques and/or algorithms to create nested binary splits on one variable at a time, in which such methodologies repeat for two or more branches until a stopping criterion is met. Decision trees include nodes that, when evaluated with test criteria, result in leaf nodes (sometimes referred to herein as leaves or sub-nodes). Tests at the decision nodes may include a comparison to a threshold value to determine a result of an inequality (e.g., greater than, less than, equal to, etc.). Each sub-node includes results in a tree split after the test, which reflects an associated quantity of data and/or subset of data points. For example, an originating data set having a first (originating) node to test for male or female individuals may split with approximately half of the original data points residing in each of two leaf nodes (e.g., one resulting leaf node for males and one resulting leaf node for females).

The data tested by decision trees may be associated with individuals, such as users of an application, members of a demographically designed panelist group, subscribers to a service, etc. In some examples, an individual user may be associated with any number of variables, such as an age, a gender, a marital status, a number of children, an income value, etc. As such, a decision tree may reference one or more variables when propagating from an originating node through one or more sub-nodes to develop conclusions associated with an originating data set. In some examples, the decision tree includes an objective, such as determining an age or average age of a group of people that have viewed an advertisement. Particular variables associated with each user are evaluated in the decision tree such that a final node reflects the average age of people who have viewed the advertisement. However, in some examples the originating data set includes missing data for one or more variables. In the event a decision tree cannot continue to propagate beyond missing data and/or data that cannot be tested as either greater than, less than or equal to a threshold value, then a regression towards a mean-value may occur, resulting in erroneous conclusions and/or results.

To avoid problems related to tree propagation when missing and/or non-testable variables occur in the originating data set, traditional decision tree techniques provide a surrogate splitting functionality. In circumstances where a splitting variable (e.g., a primary splitting variable) is not provided, not testable, NULL, and/or otherwise unavailable, a surrogate splitting variable is used to mimic a behavior of the primary splitting variable. During tree propagation, the traditional decision tree technique evaluates the surrogate splitting variable to determine a particular surrogate value to be used during propagation, thereby allowing one or more subsequent nodes to be tested during evaluation of an originating data set. The surrogate splitting variable used by the traditional decision tree technique provides an improved propagation robustness, but increases an amount of time required to propagate through the decision tree. In examples where a relatively large number of users is included in the originating data set (e.g., analyzing Facebook® users, analyzing Tencent® instant messaging service users, etc.), delays in tree propagation may become problematic when attempting to produce real-time or near real-time results/conclusions related to the originating data set. In other words, as each surrogate value is encountered by the decision tree, a corresponding processing burden occurs that can, in the aggregate, dramatically increase tree propagation time.

FIG. 1A is a portion of example decision trees shown as a naïve code block 100, sometimes referred to herein as an original code block 100. In the illustrated example of FIG. 1A, the original code block 100 includes a first decision tree 102 and a second decision tree 104. The example first decision tree 102 and the example second decision tree 104 are shown as logical expressions in the illustrated example of FIG. 1A, but decision trees may be expressed in one or more alternate forms. In some examples, decision trees may be expressed as graphical blocks of decision nodes in a hierarchical arrangement, and in some examples decision trees may be expressed as logical circuits, as described in further detail below in connection with FIGS. 1B and 3B. A decision tree engine creates the original code block 100 to determine a result using logical tests on originating data, in which each decision tree uses different variables during tree analysis/propagation. In the illustrated example of FIG. 1A, the first decision tree 102 includes known variables $A_1$, $B_1$, $C_1$ and $D_1$. The known variables are tested by one or more logical statements of the example first decision tree 102 to determine whether a corresponding branch is to be executed. Example branches may reflect an outcome of a corresponding decision tree, such as an average age or other metric of interest. However, the example decision tree 102 also includes surrogate variables, which are sometimes referred to herein as not-a-number ("NaN") variables, and are shown in the illustrated example of FIG. 1A with a subscript "n" or "N." In particular, the example first decision tree 102 includes NaN variables $A_N$, $B_N$, and $C_N$.

Figure 1B:
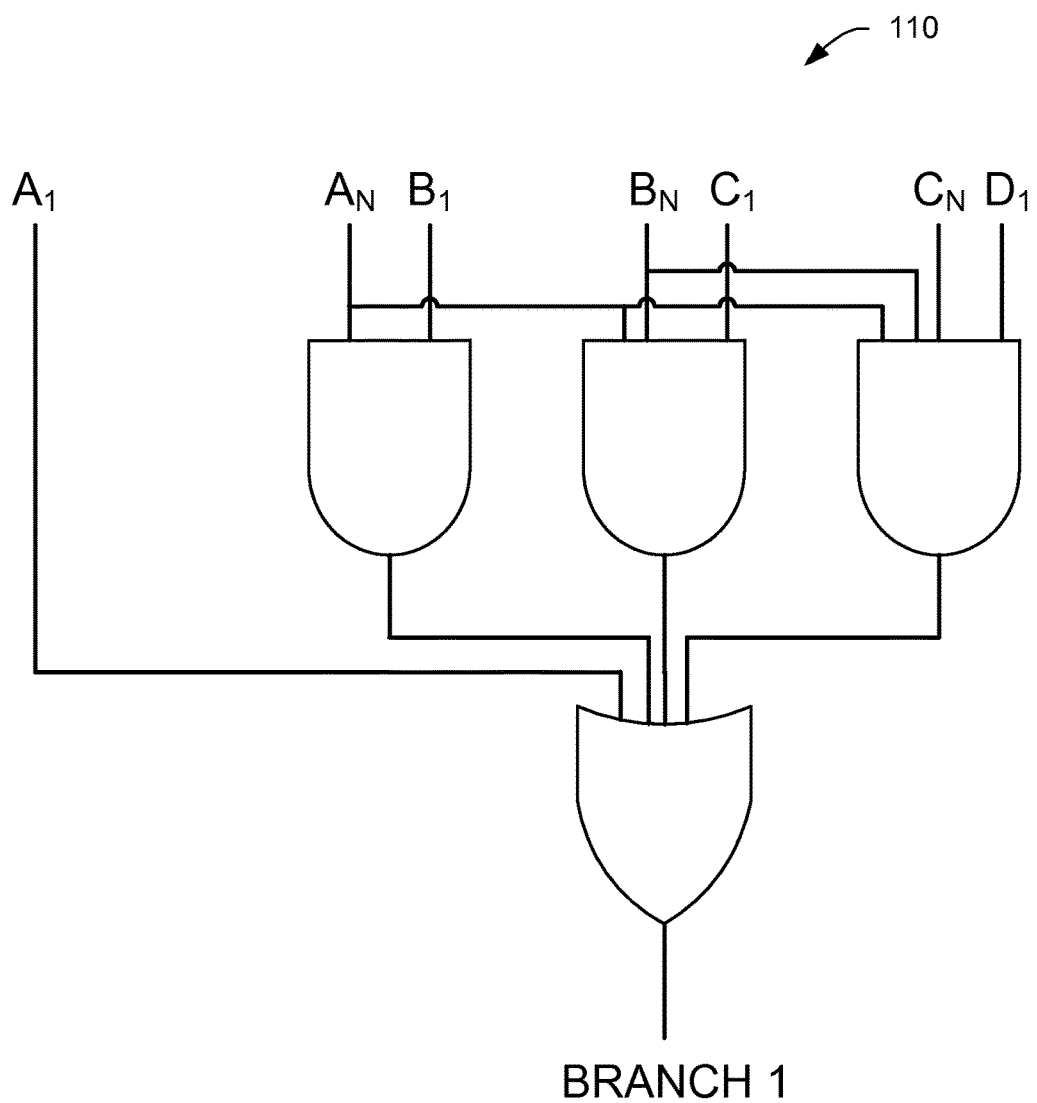
FIG. 1B is a logical circuit representation of the portion of the example decision trees of FIG. 1A.

As described above, traditional decision tree analysis/propagation techniques evaluate NaN variables at runtime as they occur in a decision tree sequence. As such, the NaN variable must be evaluated to determine a substitute value suitable to allow tree propagation to continue. However, even after a first NaN variable occurs during tree propagation, that same NaN variable may need to be re-computed in a separate and/or subsequent portion of the same or one or more different trees. To illustrate, FIG. 1B illustrates the example first decision tree 102 as a logic circuit 110. In the illustrated example of FIG. 1B, NaN variable $A_N$ must be evaluated at three separate instances prior to determining whether branch_1 is true and/or otherwise should be executed. Additionally, the logical expression of the first decision tree 102 of FIG. 1A and the logic circuit 110 of FIG. 1B show a disjunctive normal form format. In some examples, the disjunctive normal form is referred to herein as a sum-of-products (SOP) form. As such, the example first decision tree 102 and the example second decision tree 104 are referred to herein as the first SOP decision tree 102 and the second SOP decision tree 104, respectively.

Examples disclosed herein increase a computation speed of a decision tree by modifying tree logic in a manner that reduces a number of computations while maintaining the truth outcome of the original tree. As described in further detail below, examples disclosed herein (a) simplify decision tree Boolean algebra, (b) precompute NaN variables to reduce in-line processing during tree propagation, (c) rearrange branch execution order, and (d) verify completeness of non-NaN varaibles.

Figure 2:
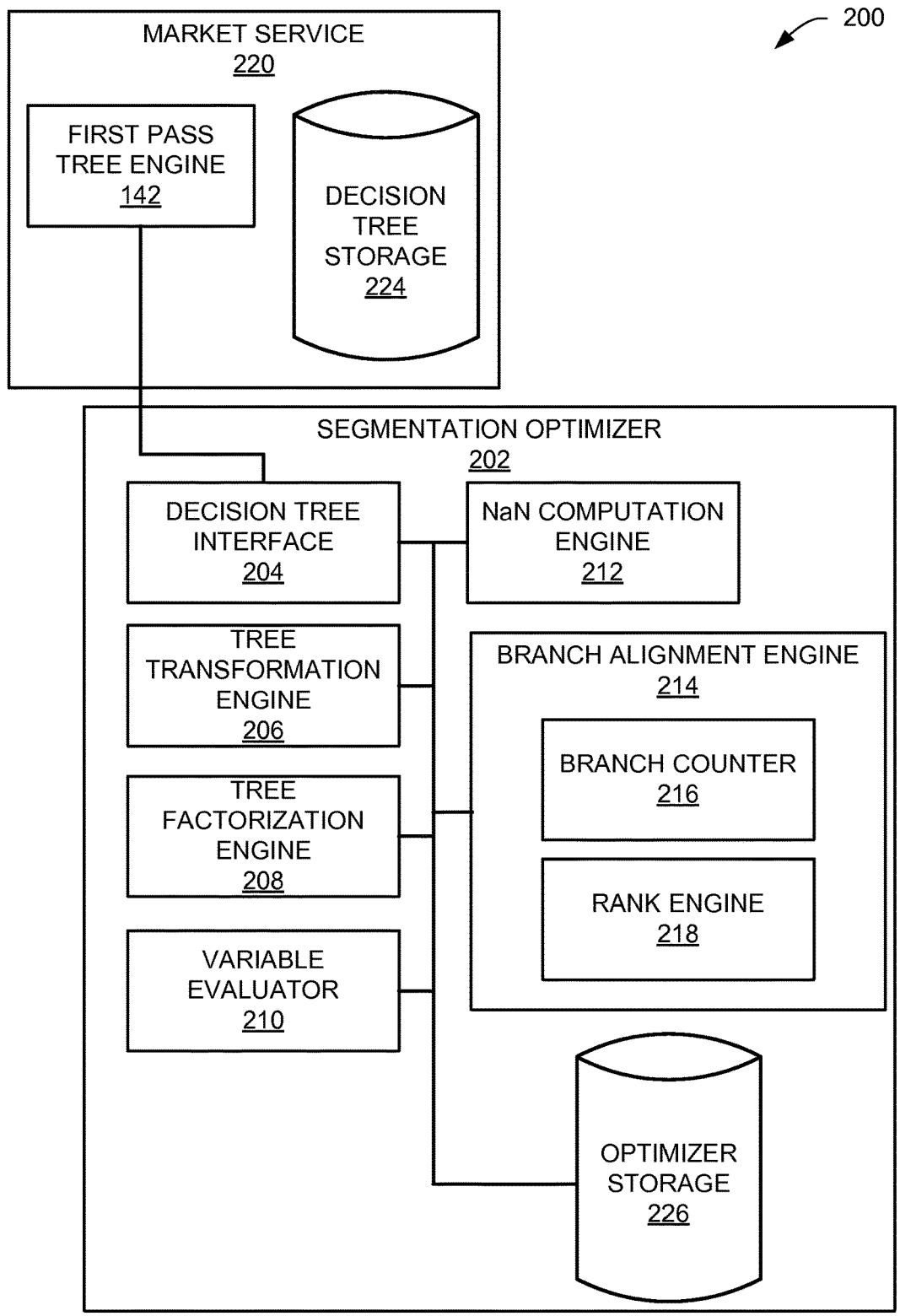
FIG. 2 is a block diagram of an example segmentation optimization system to improve decision tree execution.

FIG. 2 is a schematic illustration of a segmentation optimization system 200 to facilitate methods and apparatus to improve decision tree execution. In the illustrated example of FIG. 2, the segmentation optimization system 200 includes a segmentation optimizer 202 and a decision tree interface 204 communicatively connected to a market service 220. The example market service 220 may include a media monitoring entity, a reporting system, and/or an Internet service, such as an e-mail service, social networking service (e.g., Facebook®, Tencent®), etc. The example market service 220 includes an example first pass tree engine 222 to generate one or more decision trees, and an example decision tree storage 224 to store the one or more decision trees and/or data to be evaluated by the decision trees. Decision trees generated by the example first pass tree engine 222 may include the example original code block 100 of FIG. 1A, which includes the example first SOP decision tree 102 and the example second SOP decision tree 104. The example segmentation optimizer 202 includes an example tree transformation engine 206, an example tree factorization engine 208, example variable evaluator 210, and an example NaN computation engine 212. The example segmentation optimizer 202 also includes an example branch rearrangement engine 214, an example branch counter 216, an example rank engine 218 and an example optimizer storage 226.

In operation, the example decision tree interface 204 retrieves, receives and/or otherwise obtains one or more code blocks associated with decision tree logic, such as the example original code block 100 of FIG. 1A. As described above, the example market service 220 may share and/or otherwise provide data having relatively large numbers of participants. For instance, the social media service Tencent® includes over eight hundred million subscribers, and decision trees are used to identify one or more types of information from those subscribers. For instance, in the event an advertisement is observed by a portion of subscribers, those subscribers may have an associated tag or variable to indicate their observation and/or consumption of the advertisement. If the example market service 220 also wants to know particular demographics associated with the subscribers that observed the advertisement, then a decision tree may be used to divide the subscriber data set into one or more subsets of data that are homogeneous amongst themselves, but heterogeneous with respect to other subsets of data generated at decision tree nodes. Two example subsets of data that are homogeneous amongst themselves and heterogeneous with each other is a first subgroup of subscribers that observed the advertisement, and a second subgroup of subscribers that did not observe the advertisement. Thus, these two example subgroups may represent the results of a first decision node of a decision tree used by the example market service 220. In other examples, decision trees help correct for errors that are believed to reside in data sets. In the event a particular user is not truthful about his/her age, or in the event a particular user mistakenly chooses an incorrect age category (e.g., from a dropdown box), then examples disclosed herein may help correct such deficiencies. When an aspect of data is believed to be suspect (e.g., a stated age), decision trees may be used with other known properties of the users to derive a correct value for the suspect data.

Continuing the example above, in the event an analyst associated with the market service also wants to know an average age of only those subscribers that observed the advertisement, then further subsequent branches of decision tree logic may perform inequality tests for each subscriber to determine which resulting node they belong in. For instance, one test node may identify subgroups of subscribers based on a test of the age thirty-four, which splits the group into a subgroup of subscribers younger than thirty-four years of age, and a subgroup of subscribers equal to or older than thirty-four years of age. Additionally, for the subgroup younger than thirty-four years of age, a further subsequent test node may check for those subscribers younger than thirteen years of age, which results in one subgroup of subscribers younger than thirteen and one subgroup of subscribers older than or equal to thirteen (but less than thirty-four years of age because the source data for that respective branch only included subscribers less than thirty-four years of age).

As the example decision tree propagates, such as the trees associated with the example original code block 100 of FIG. 1A, resulting nodes identify one or more subsets of subscribers at a relatively greater degree of specificity and/or granularity. However, in the event a variable associated with a subscriber to be tested is missing or cannot be reconciled with a truth test (e.g., the variable is text when the test requires a numeric value), then a corresponding tree node cannot continue to propagate. In some examples, where a surrogate (NaN) variable is not used by the decision tree, then a regression towards a mean value may result. While an occasional NaN variable may not influence a mean result, the aggregate of NaN variables in a context of tens of thousands, millions, etc. subscribers will skew a mean value to an unacceptable degree of accuracy. In some examples, younger subscriber subgroups may be estimated higher than a true value, while older subscriber subgroups may be estimated lower than the true value. Such effects may illustrate an erroneous convergence of the mean value that fails to reflect the truth.

Figure 3A:
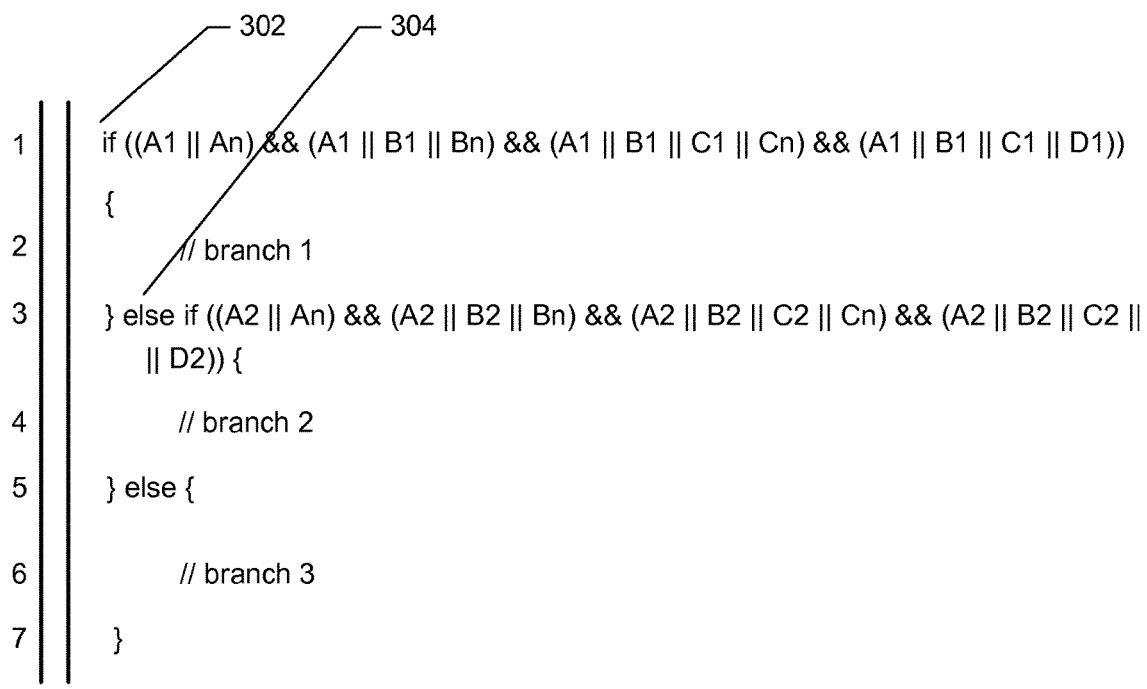
FIG. 3A is a portion of an example transformed code block based on the example disjunctive normal form decision tree of FIG. 1A.

While traditional decision trees and corresponding native code blocks (e.g., the example original code block 100 of FIG. 1A) consider surrogate (NaN) variables when an original variable is missing or incapable of truth test(s), such NaN variables introduce substantial delay on the flow of the code block(s). When the example original code block 100 evaluates a data set, it will consume a corresponding duration of time and/or processor clock cycles. To reduce and/or otherwise minimize execution/propagation time associated with the decision tree code blocks, the example tree transformation engine 206 transforms the code blocks from a disjunctive normal form (sum of products—"SOP") to a conjunctive normal form (product of sums—"POS"). For tree logic expressions in the SOP form, all variables within sub-terms must be true (e.g., a logical AND constraint), but any one of the groups of sub-terms could be true (e.g., a logical OR constraint). For instance, in the example original code block 100 of FIG. 1A, the expressions ($A_N$ && $B_1$), ($A_N$ && $B_N$ && $C_1$), ($A_N$ && $B_N$ && $C_N$ && $D_1$) must satisfy a logical AND test therein in which evaluation of some terms occur more than one time within each expression. Generally speaking, a disjunctive normal form may be converted and/or otherwise transformed into a conjunctive normal form by way of application of De Morgan's transformation theorems. FIG. 3A is an example transformed code block 300 shown in conjunctive normal form, which is based on the original native code block 100 of FIG. 1A. In the illustrated example of FIG. 3A, a first POS decision tree 302 and a second POS decision tree 304 have been transformed via Boolean logic to reflect the product of sums. Note that the example first POS decision tree 302 only needs to evaluate the NaN variable $A_N$ once, as compared to the first SOP decision tree 102 of FIG. 1A, in which the NaN variable $A_N$ required evaluation three separate times. Note that, unlike the SOP form of FIG. 1A, transformation into the POS form of FIG. 3A permits any one of the values within sub-terms to be true, effectively eliminating redundant computation of variables in the SOP expression. Additionally, the transformation yields computational improvements (reduces computation costs) during tree propagation while maintaining an identical truth outcome as compared to the original decision tree(s). When the example transformed code block 300 evaluates the data set, it will consume a corresponding duration of time and/or processor cycles less than that of the example original code block 100.

Figure 3B:
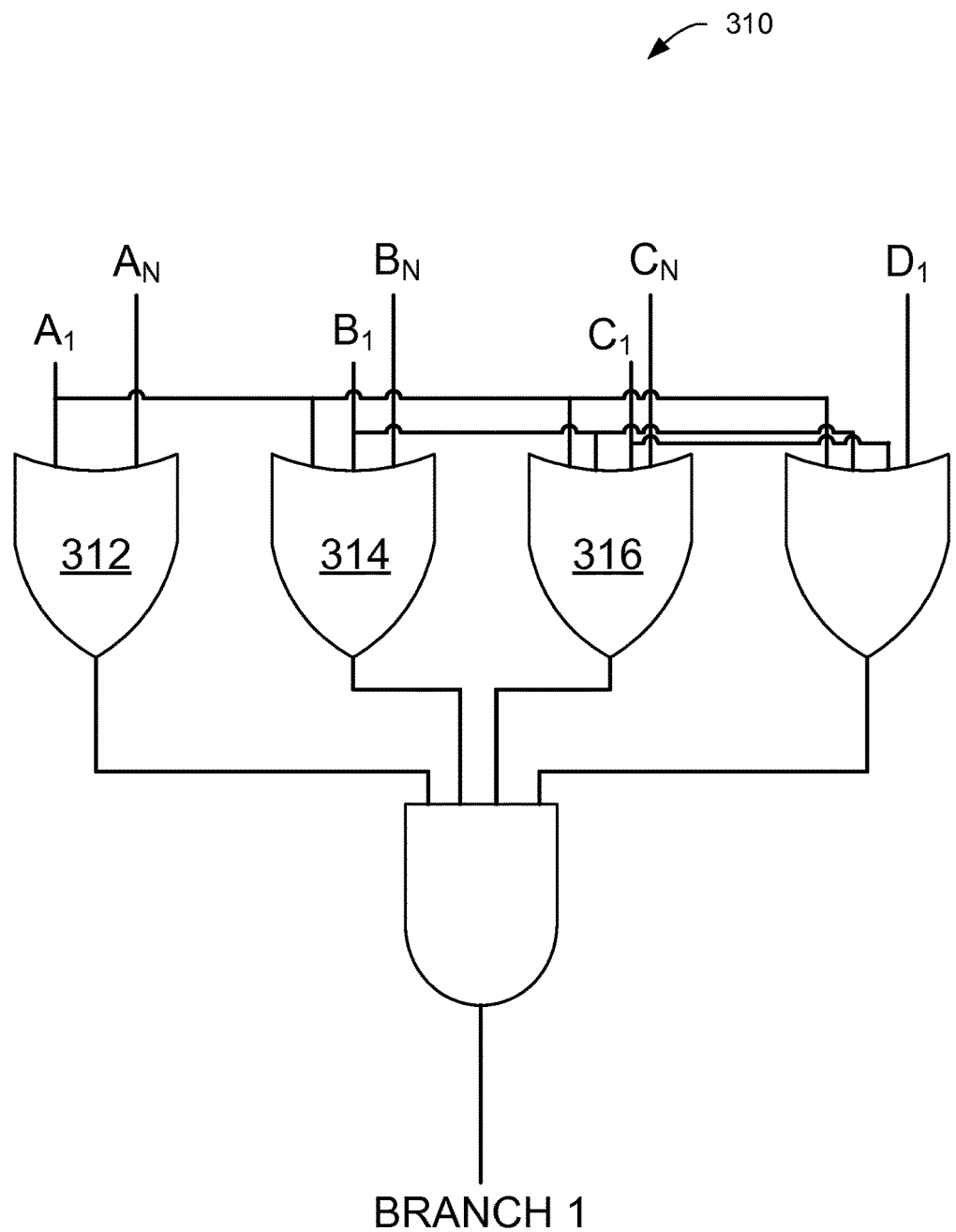
FIG. 3B is a logical circuit representation of a decision tree of FIG. 3A.

To illustrate, FIG. 3B illustrates the example first POS decision tree 302 as a logic circuit 310. In the illustrated example of FIG. 3B, NaN variable $A_N$ is evaluated only once at a first logical OR gate 312, as compared with the example first SOP decision tree 102 of FIG. 1B, in which NaN variable $A_N$ is evaluated three separate times. Additionally, the NaN variables $B_N$ and $C_N$ are evaluated only once each in the example first POS decision tree 302 at a second logical OR gate 314 and a third logical OR gate 316, respectively.

Figure 4:
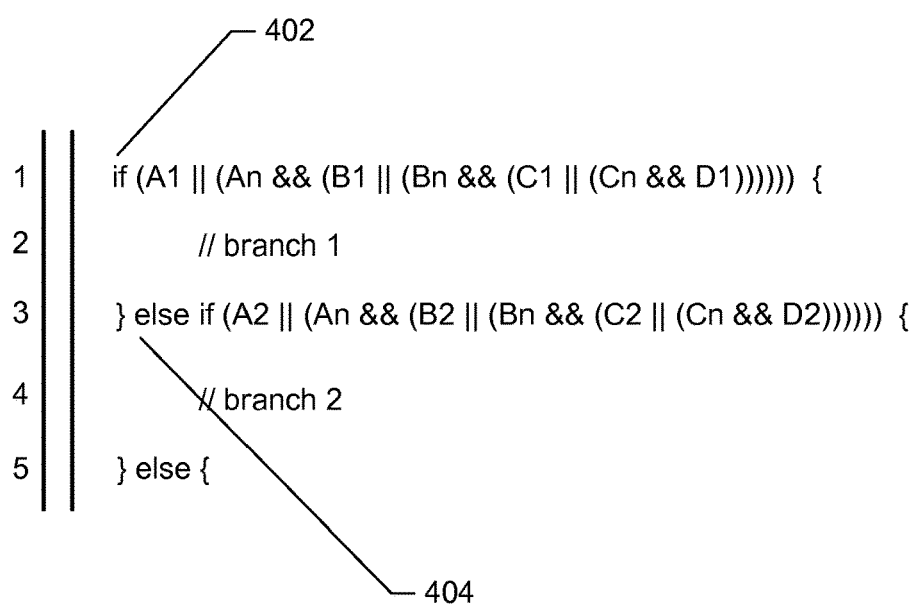
FIG. 4 is a portion of a factorized code block based on the example transformed code block of FIG. 3A.

One benefit of expressing decision trees in the POS form is that terms can be Boolean factorized to yield a single evaluation of any inequality/test for one or more trees. Code blocks transformed into the POS form are retrieved and/or otherwise received by the example tree factorization engine 208 to identify one or more variables that can be factored out of respective decision trees. The example tree factorization engine 208 identifies, for example, a variable that is common to two or more sub-expressions of a POS transformed decision tree. Because the POS transformed decision tree includes sub-expressions that are logically ANDed with other sub-expressions, any common variables identified by the example tree factorization engine 208 may be factored out to simplify the overall decision tree expression. As such, the example tree factorization generates a simplified version of the expression. FIG. 4 is an example code block 400 shown in POS form after factorization of the example code block 300 of FIG. 3A. In the illustrated example of FIG. 4, a first factorized POS decision tree 402 and a second factorized POS decision tree 404 have been factorized to simplify the associated expressions, which results in reduced computational resources when propagating/evaluating the respective trees. For instance, the variable $A_1$ in the example first factorized POS decision tree 402 has been factored out to occur once, as compared with the example first POS decision tree 302 of FIG. 3A, in which variable $A_1$ occurred four times. Similarly, variable $B_1$ in the example first factorized POS decision tree 402 has been factored out to occur once, as compared with the example first POS decision tree 202 of FIG. 2A, in which variable $B_1$ occurred three times. Similar to the transformations described above, the factorizations of the decision trees improves computational resource efficiency (reduces computation burdens) while maintaining an identical truth outcome as the original decision tree(s).

As described above, evaluation of NaN variables during tree propagation imposes a corresponding computational burden and slows a speed at which the tree can propagate. The example NaN computation engine 212 evaluates retrieved and/or otherwise received code blocks (e.g., code blocks that have been transformed from SOP to POS format, code blocks that have been factorized, original code blocks) prior to tree propagation to identify surrogate/NaN variables that could cause such computational burdens. If the example NaN computation engine 212 identifies a NaN variable, that NaN variable is corrected based on the context of the variable type. In some examples, a missing variable value is replaced with a default value, while in other examples a floating point value is rounded up or down when the variable type is integer (e.g., 12.3 is rounded down to 12).

Additionally, the example NaN computation engine 212 evaluates the context in which the NaN variable is used so that it can be converted into a binary value rather than a value to be used in a relatively more computationally demanding inequality test. For example, if the example NaN variable having a corresponding value of 12 (e.g., after rounding down from 12.3 to 12) is to be used in a decision node that tests for an age greater than twenty-one, the example NaN computation engine 212 converts the NaN variable to a Boolean FALSE value. As such, during tree propagation a Boolean test may occur, which is computationally faster than an inequality test on the value 12.

The example branch rearrangement engine 214 evaluates code blocks to identify an optimized order of decision tree propagation. In operation, the example branch rearrangement engine 214 invokes the example factorization engine 208 to select a code block of interest, such as a code block that has been transformed and factorized. The example branch counter 216 determines occurrence rates for each branch within the selected code block, and the example rank engine 218 ranks the branches (e.g., branch_1, branch_2, etc.) based on a frequency of occurrence. In some examples, decision tree propagation orders are prioritized based on corresponding rank values for branches containing NaN variables first, and then branches containing non-NaN variables (e.g., "regular" variables) thereafter. In other words, because the NaN variables have been converted into Boolean values, branches of decision trees that evaluate the NaN variables may execute relatively faster than regular variables that may require an inequality test. As such, overall code block execution speed may be improved by rearranging the branches associated with NaN variables first.

In some examples, NaN variable prioritization is not invoked and, instead, branches associated with the most frequently occurring variables (either NaN variables or regular variables) are prioritized to be evaluated prior to branches associated with relatively lower frequency of occurrence. For example, assuming that variable $A_2$ is identified to occur more frequently than variable $A_1$, then rearranging/swapping decision tree execution to force branches having variable $A_2$ to be evaluated before branches having variable $A_1$ results in processing clock cycles overall.

While an original code block received and/or otherwise retrieved by the example decision tree interface 204 includes identified instances of NaN variables, in some examples the first pass tree engine 222 of the example market service 220 may not have identified all such instances of NaN variables. To verify variable completeness, the example tree factorization engine 208 selects a code block of interest, and the example variable evaluator 210 identifies a regular variable (e.g., not designated as NaN) to determine whether the variable contains a valid value. In some examples, a valid value is determined based on whether the variable value is missing or is NULL. In some examples, a valid value is determined by performing a type check of the variable, such as a variable parameter that identifies a type (e.g., text, integer, float, etc.), and checks the value to verify it is consistent with the variable type. For example if a variable type parameter reflects type INT and the value includes text (e.g., "green"), then the example variable evaluator 210 reclassifies the regular variable as a NaN. When one or more variables are reclassified as a NaN variable, the example NaN computation engine 212 applies a correction to the associated value, and redefines the variable as a Boolean type to improve execution speed during tree propagation, as described above.

While an example manner of implementing the segmentation optimizer 202 of FIG. 2 is illustrated in FIGS. 1A, 1B, 3A, 3B and 4, one or more of the elements, processes and/or devices illustrated in FIG. 2 may be combined, divided, re-arranged, omitted, eliminated and/or implemented in any other way. Further, the example decision tree interface 204, the example tree transformation engine 206, the example tree factorization engine 208, the example variable evaluator 210, the example NaN computation engine 212, the example branch arrangement engine 214, the example branch counter 216, the example rank engine 218, the example optimizer storage 226 and/or, more generally, the example segmentation optimizer 202 of FIG. 2 may be implemented by hardware, software, firmware and/or any combination of hardware, software and/or firmware. Thus, for example, any of the example decision tree interface 204, the example tree transformation engine 206, the example tree factorization engine 208, the example variable evaluator 210, the example NaN computation engine 212, the example branch arrangement engine 214, the example branch counter 216, the example rank engine 218, the example optimizer storage 226 and/or, more generally, the example segmentation optimizer 202 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example decision tree interface 204, the example tree transformation engine 206, the example tree factorization engine 208, the example variable evaluator 210, the example NaN computation engine 212, the example branch arrangement engine 214, the example branch counter 216, the example rank engine 218, the example optimizer storage 226 and/or, more generally, the example segmentation optimizer 202 is/are hereby expressly defined to include a tangible computer readable storage device or storage disk such as a memory, a digital versatile disk (DVD), a compact disk (CD), a Blu-ray disk, etc. storing the software and/or firmware. Further still, the example segmentation optimizer 202 of FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the segmentation optimizer 202 of FIG. 2 are shown in FIGS. 5-8. In these examples, the machine readable instructions comprise a program(s) for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program(s) is/are described with reference to the flowcharts illustrated in FIGS. 5-8, many other methods of implementing the example segmentation optimizer 202 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
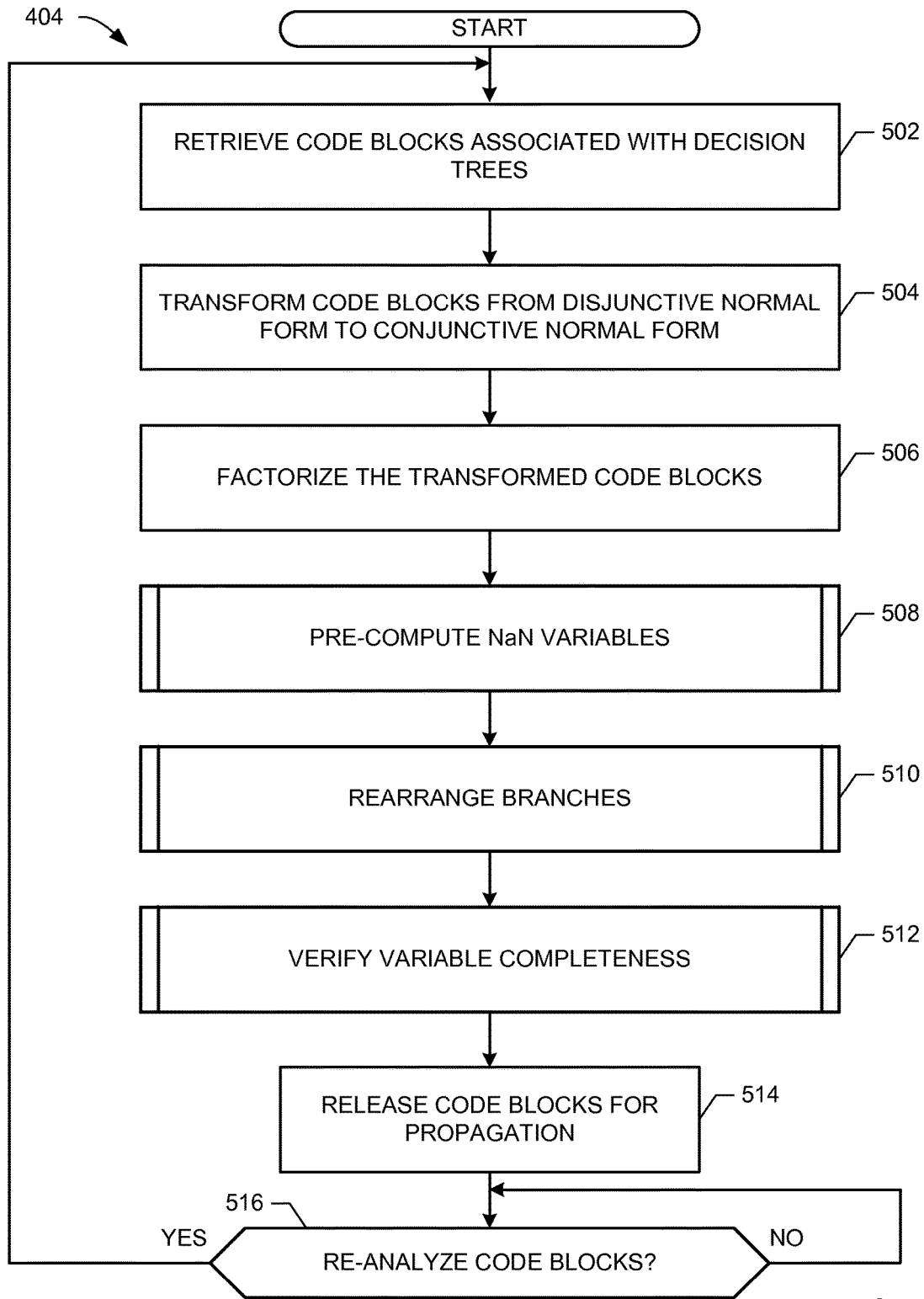
FIG. 5 is a flowchart representative of example computer readable instructions, which may be executed to implement the segmentation optimization system of FIG. 2, to improve decision tree execution.

The program 500 of FIG. 5 begins at block 502, where the example decision tree interface 204 retrieves code blocks associated with decision trees, such as code blocks generated by the example first pass tree engine 222 of the example market service 220. In some examples, the market service 220 (e.g., a social media service) stores subscriber data in the example decision tree storage 224 with decision trees to derive information from the subscriber data. As described above, the decision trees from the example market service 220 are formed as sum of products (SOP) expressions, also referred to herein as disjunctive normal form expressions. The example tree transformation engine 206 transforms the retrieved code blocks from the SOP expression to a product of sums (POS) expression (block 504), also referred to herein as conjunctive normal form expressions. The transformation(s) performed by the example tree transformation engine 206 simplifies the decision trees of the code blocks to reduce a number of occasions of variable evaluation during tree propagation, as shown by the comparison of the original code block 100 of FIG. 1A and the example transformed code block 300 of FIG. 3A.

The example tree factorization engine 208 factorizes the example transformed code block to factor out duplicative variables that may be present in the decision tree expression (block 506). Results of factorization performed by the example tree factorization engine 208 may be stored for later access in the example optimizer storage 226. As described above, factoring out duplicative variables enables a corresponding reduction in computational operations that need to occur during propagation of the factorized expression. The example NaN computation engine 212 pre-computes NaN variables included in decision trees from the first pass tree engine 222 to enable further computational benefits and tree propagation speed improvements (block 508). Additional tree propagation speed improvements result when the example branch arrangement engine 214 rearranges an order in which one or more trees is evaluated (block 510). While the example first pass tree engine 222 included NaN variables present in the code blocks, the example variable evaluator 210 evaluates all remaining original variables to ensure that future tree propagation efforts are not slowed down and/or otherwise halted by an errant variable value (block 512). Code blocks that (a) have been transformed, (b) have been factorized, (c) pre-computed the NaN variables, and (d) verified all original variables for completeness, are released back to the example market service 220 so that analysis of data to be used with the code blocks can be performed.

In some examples, the decision tree interface 204 transmits and/or otherwise makes available the optimized code blocks to the example decision tree storage 224 of the example market service 220 (block 514). Because source data from the example market service 220 may be dynamic and/or otherwise frequently changing, the example segmentation optimizer 202 determines whether to re-analyze the code blocks and/or receives a request from the market service 220 to re-analyze the code blocks (block 516). Control then returns to block 502.

Figure 6:
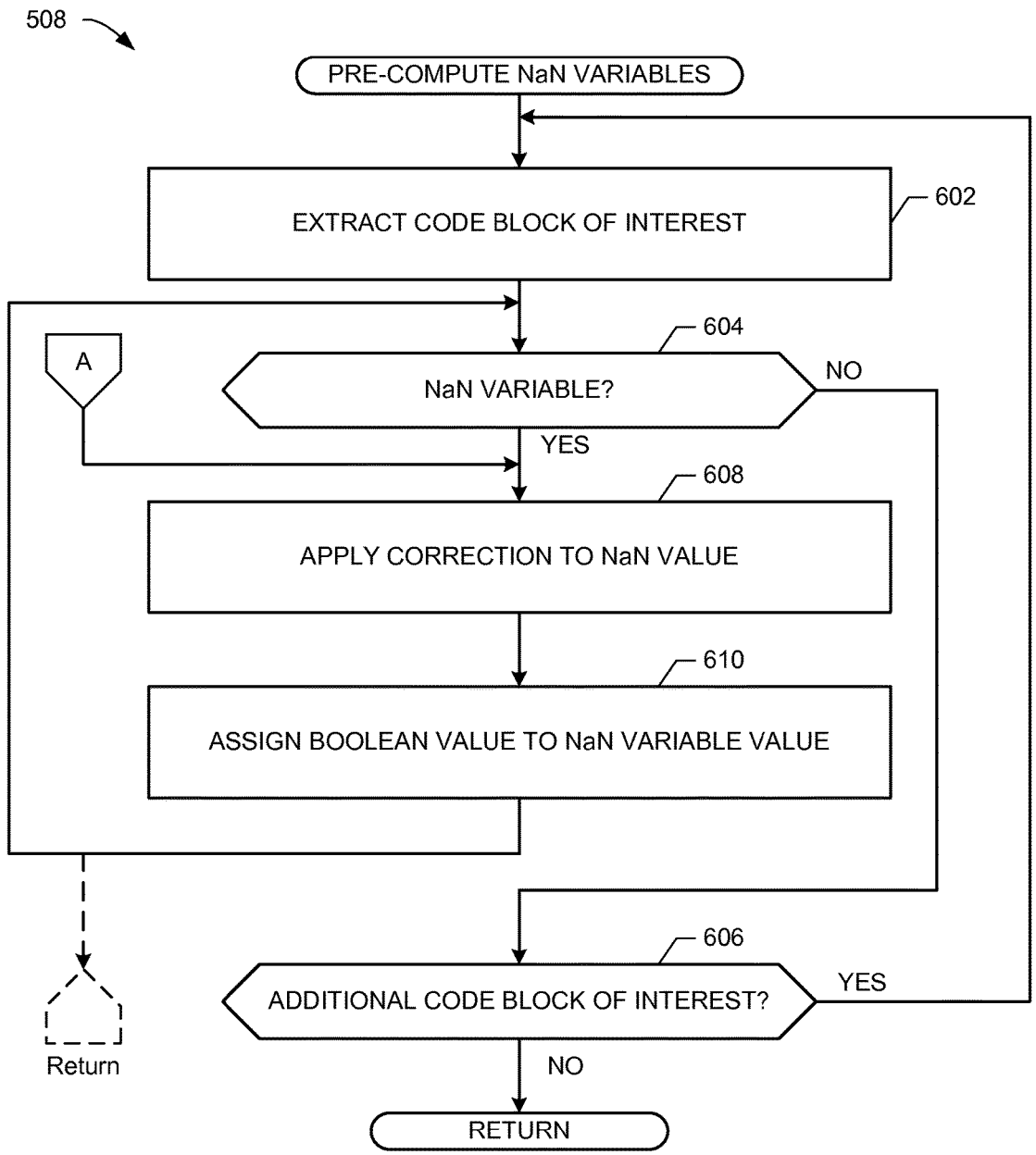
FIG. 6 is a flowchart representative of example computer readable instructions that may be executed to pre-compute surrogate variables.

FIG. 6 includes additional detail associated with pre-computing NaN variables of block 508. In the illustrated example of FIG. 6, the example decision tree interface 204 retrieves, extracts and/or otherwise receives a code block of interest from the example decision tree storage 224 of the example market service 220 (block 602). The example NaN computation engine 212 evaluates the variables of the obtained code block of interest to identify NaN variables (block 604). In some examples, NaN variables are identified by a subscript "n" or "N," but any other type and manner of NaN variable indicator may be used. In the event the example NaN computation engine 212 does not identify any NaN variables from the obtained code block of interest (block 604), then the example decision tree interface 204 determines if another code block of interest is to be evaluated (block 606). If so, then control returns to block 602 where the example decision tree interface 204 retrieves, extracts and/or otherwise receives another code block of interest from the example decision tree storage 224 of the example market service 220.

When the example NaN computation engine 212 identifies a NaN variable in the obtained code block of interest (block 604), the NaN computation engine 212 evaluates a value associated with the NaN variable to apply a correction value (block 608). As described above, the example NaN computation engine 212 evaluates the context in which the NaN variable is used to apply the correction value, which may include a rounding operation to a floating value when an integer is required. In other examples, a correction value may include a default value, while in still other examples the correction value may include a replacement of text data with an integer, or vice-versa. Additionally, to further increase a speed of decision tree propagation, the corrected NaN value is evaluated in its context of an associated decision tree node to convert the NaN variable value to a Boolean statement (e.g., TRUE or FALSE, 1 or 0). If the context of the associated decision tree node is, for example, to establish whether an age value is above or below a threshold value (e.g., twenty-one years old), then the example NaN computation engine 212 replaces the integer value of the NaN variable with the Boolean statement based on whether the previous NaN variable value satisfies that threshold (block 610). Continuing with the example threshold value of twenty-one years of age, if the original NaN variable value was twelve, then the example NaN computation engine 212 assigns a Boolean statement of FALSE to the NaN variable. As such, when tree propagation occurs at a later time, fewer computational resources are required to resolve a truth test of that NaN variable because simple binary logic tests of TRUE or FALSE consume fewer computational resources as compared with logical tests of inequalities. In still other examples, in the event a decision tree does not include surrogate variables, optimization analysis can be avoided and the original decision trees may be used.

Figure 7:
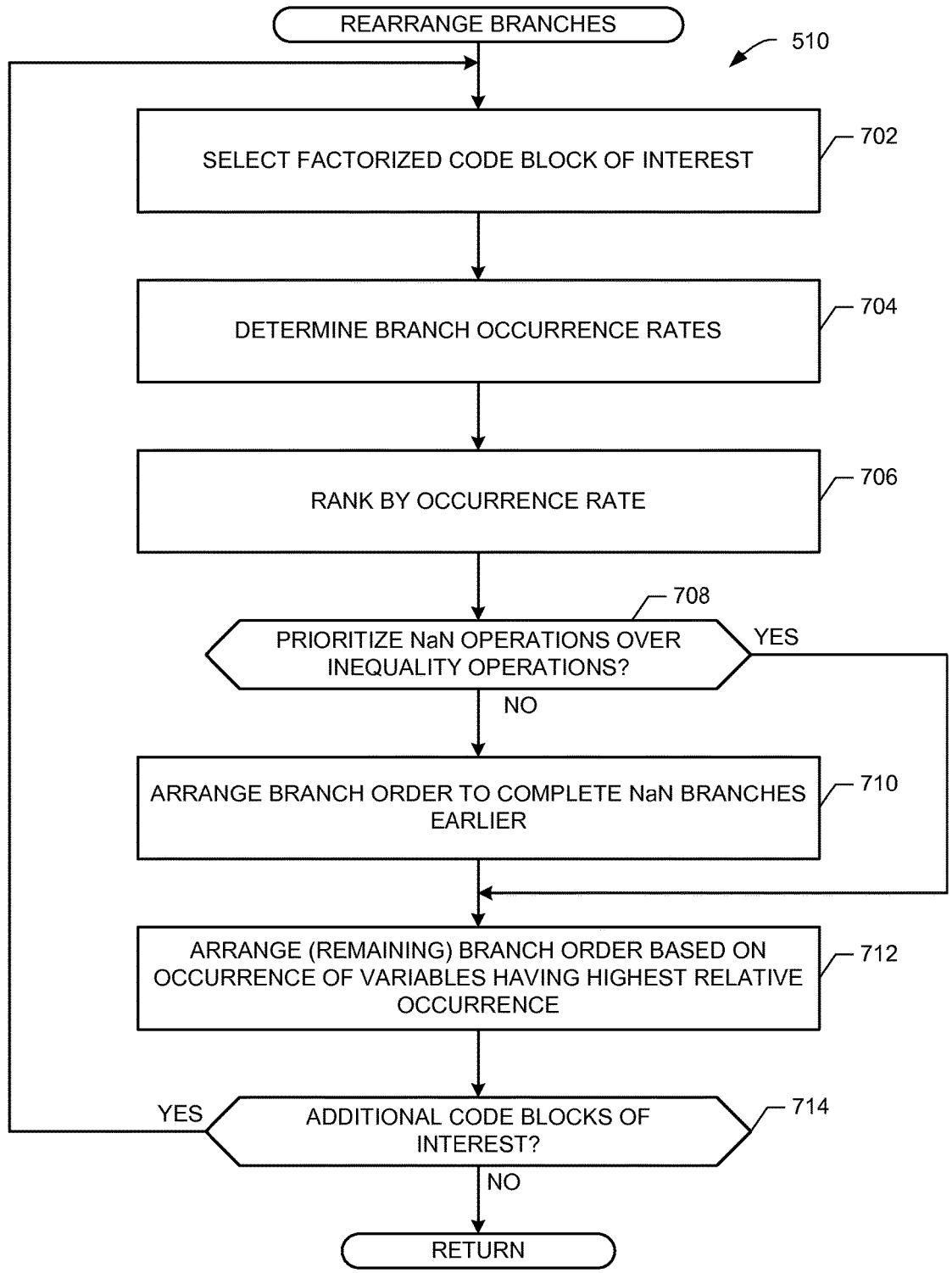
FIG. 7 is a flowchart representative of example computer readable instructions that may be executed to rearrange branches of the factorized code block of FIG. 4.

FIG. 7 includes additional detail associated with rearranging branches of block 510. In the illustrated example of FIG. 7, the example factorization engine 208 selects a factorized code block of interest from the example optimizer storage 226 (block 702). The example branch counter 216 determines occurrence rates for each branch within the selected factorized code block of interest (block 704), and the example rank engine 218 ranks those branches by their associated occurrence rates (block 706). Generally speaking, tree propagation speeds may be improved (e.g., reduced) by prioritizing the evaluation of decision trees (having an associated branch) having a relatively higher occurrence of particular variables prior to other decision trees having variables that do not occur as often within the selected code block. The example branch rearrangement engine 214 determines whether prioritization of decision trees having NaN variables over regular variables is to occur (block 708). If so, then those decision trees having a relatively greater occurrence of NaN variables is arranged by the example branch rearrangement engine 214 to be evaluated prior to other decision trees that include regular variables (block 710). On the other hand, if NaN variable prioritization is not to occur (block 708), then the example branch rearrangement engine 214 arranges branch/decision tree evaluation order based on the raw occurrence values ranked by the example rank engine 218 (block 712). In the event more factorized code blocks of interest are to be analyzed (block 714), control returns to block 702.

Figure 8:
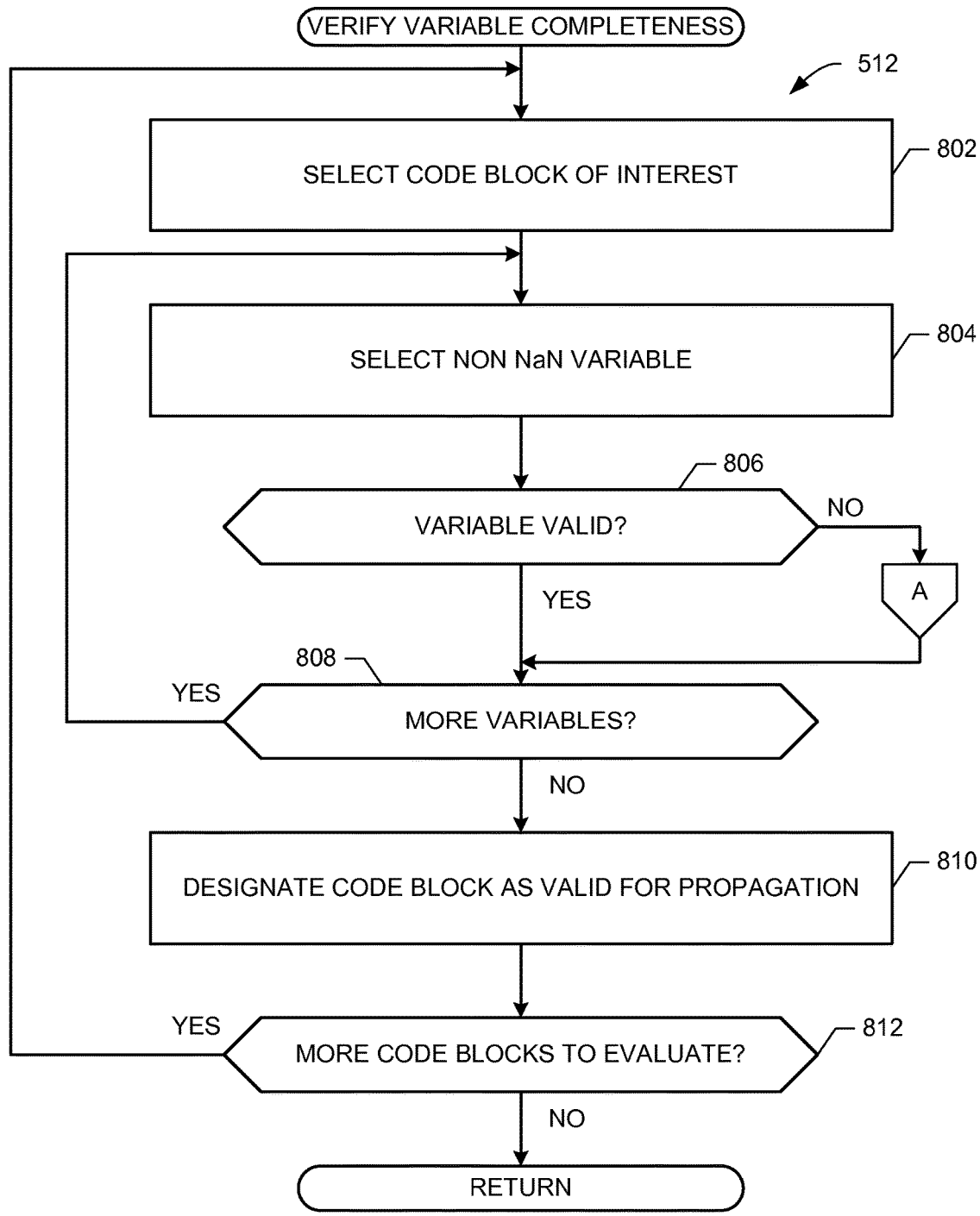
FIG. 8 is a flowchart representative of example computer readable instructions that may be executed to verify variable completeness of the optimization system of FIG. 2.

FIG. 8 includes additional detail associated with verifying variable completeness of block 512. In the illustrated example of FIG. 8, the example tree factorization engine 208 selects a factorized code block of interest, such as a code block factorized by the example tree factorization engine 208 and stored in the example optimization storage 226 (block 802). As described above, while NaN variables were provided in original code blocks from the example decision tree storage 224 of the example market service 220, there is a possibility that the market service 220 missed one or more regular variables that may contain errant values capable of causing tree propagation to fail. The example variable evaluator 210 parses and/or otherwise extracts a regular variable (e.g., non-NaN variable) from the selected code block of interest (block 804), and evaluates the variable value to determine whether it is valid and/or otherwise capable of logical testing (block 806).

For example, if a regular variable includes a NULL value or a missing variable, then any future attempts to evaluate that variable during tree propagation will fail. If the example variable evaluator 210 identifies a variable value as invalid (block 806), then the variable is reclassified as NaN, and control returns to block 608 of FIG. 6 to apply a correction to the value of the NaN variable. However, if the regular variable is valid (block 806, then the example variable evaluator 210 determines whether the retrieved code block of interest includes an additional regular variable that has not yet been verified (block 808). In the event the retrieved code block includes another regular variable to be verified (block 808), control returns to block 804 to select that next variable. Otherwise, when all regular variables have been verified, the example variable evaluator 210 designates the retrieved code block of interest as validated and ready for tree propagation evaluation (block 810). If the example variable evaluator 210 determines that there are additional code blocks of interest that have not yet been verified (block 812), then control returns to block 802.

Figure 9:
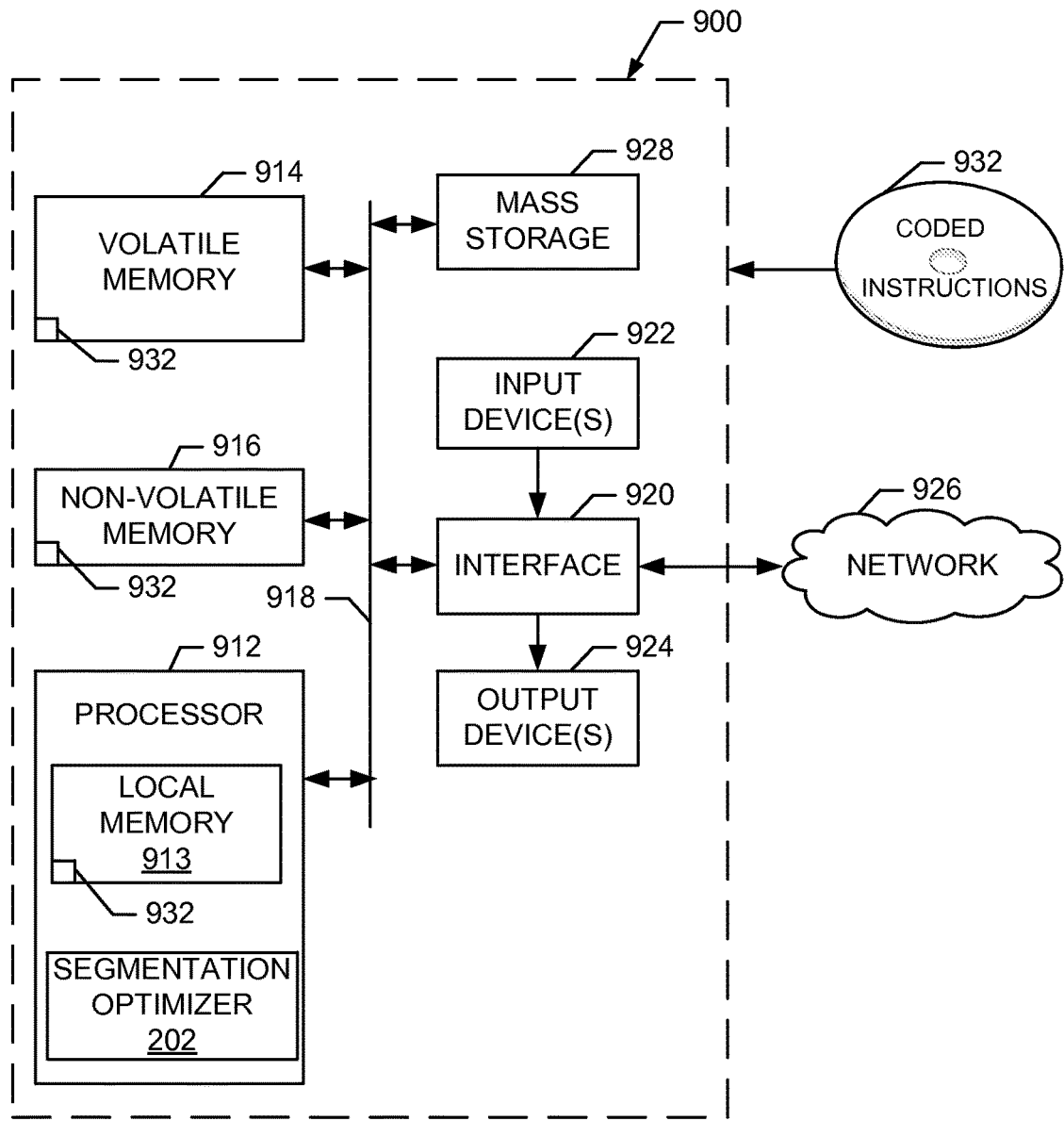
FIG. 9 is a block diagram of an example processor platform capable of executing the instructions of FIGS. 5-8 and/or to implement the optimization system of FIG. 2.

FIG. 9 is a block diagram of an example processor platform 900 capable of executing the instructions of FIGS. 5-8 to implement the segmentation optimization system 200 of FIG. 2. The processor platform 900 can be, for example, a server, a personal computer, an Internet appliance, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 1012. The input device(s) can be implemented by, for example, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926

(e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture reduce computational burdens associated with decision tree evaluation, particularly when relatively large data sets are used with the decision trees. Examples disclosed herein identify decision tree expressions that lack an optimized form and, when identified, convert such expressions into a form that permits reduction of duplicative variable computation. Additionally, examples disclosed herein permit expression factorization to eliminate additional duplicative variables that may occur in a conjunctive normal form. While traditional decision trees may identify surrogate variables when values associated with those variables would, if uncorrected, halt further propagation of decision trees, examples disclosed herein further analyze the surrogate variables to increase tree propagation speed by converting them to binary true/false values. Moreover, examples disclosed herein apply such conversions to the surrogate variables prior to decision tree propagation so that propagation runtime is not halted and/or otherwise slowed down to process computationally intensive inequalities on the fly.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to reduce decision tree evaluation time, comprising:
   retrieving, from a storage location via a network, by executing instructions with a processor, a decision tree logic expression in a sum-of-products (SOP) form, the SOP form including first subexpressions having a logical OR relationship, the decision tree logic expression consuming a first duration to evaluate a dataset;
   eliminating, by executing instructions with the processor, redundant variables of the decision tree logic expression by transforming the decision tree logic expression into a product-of-sums (POS) form, the POS form including second subexpressions having a logical AND relationship; and
   evaluating, by executing instructions with the processor, the data set with the decision tree logic expression in the POS form, the decision tree logic expression in the POS form consuming a second duration to evaluate the data set that is less than the first duration.

2. A method as defined in claim 1, further including identifying a first variable that is common to at least two of the first subexpressions.

3. A method as defined in claim 2, further including generating a simplified version of the transformed decision tree logic expression that factors out the first variable common to the at least two of the first subexpressions.

4. A method as defined in claim 1, further including identifying surrogate variables associated with the transformed decision tree logic expression, the surrogate variables including a non-Boolean value.

5. A method as defined in claim 4, further including replacing the non-Boolean value with a correction value when the non-Boolean value cannot be evaluated with an inequality test.

6. A method as defined in claim 5, wherein the inequality test includes at least one of a greater-than inequality test, a less-than inequality test, or an equal test.

7. A method as defined in claim 5, wherein the inequality test is associated with a threshold value.

8. A method as defined in claim 5, wherein the non-Boolean value is at least one of NULL or missing.

9. A method as defined in claim 5, further including reducing an evaluation computation burden on the processor by assigning the correction value as a binary value.

10. An apparatus to reduce decision tree evaluation time, comprising:
    a decision tree interface to retrieve, from a storage location via a network, a decision tree logic expression in a sum-of-products (SOP) form, the SOP form including first subexpressions having a logical OR relationship, the decision tree logic expression consuming a first duration to evaluate a data set;
    a tree transformation engine to eliminate redundant variables of the decision tree logic expression by transforming the decision tree logic expression into a product-of-sums (POS) form, the POS form including second subexpressions having a logical AND relationship; and
    a segmentation optimizer to evaluate the data set with the decision tree logic expression in the POS form, the decision tree logic expression in the POS form consuming a second duration to evaluate the data set that is less than the first duration.

11. An apparatus as defined in claim 10, further including a tree factorization engine to identify a first variable that is common to at least two of the first sub expressions.

12. An apparatus as defined in claim 11, wherein the tree factorization engine is to generate a simplified version of the transformed decision tree logic expression that factors out the first variable common to the at least two of the first subexpressions.

13. An apparatus as defined in claim 10, further including a variable evaluator to identify surrogate variables associated with the transformed decision tree logic expression, the surrogate variables including a non-Boolean value.

14. An apparatus as defined in claim 13, further including a not-a-number (NaN) computation engine to replace the non-Boolean value with a correction value when the non-Boolean value cannot be evaluated with an inequality test.

15. An apparatus as defined in claim 14, wherein the inequality test includes at least one of a greater-than inequality test, a less-than inequality test, or an equal test.

16. An apparatus as defined in claim 14, wherein the inequality test is associated with a threshold value.

17. An apparatus as defined in claim 14, wherein the non-Boolean value is at least one of NULL or missing.

18. An apparatus as defined in claim 14, wherein the NaN computation engine is to reduce an evaluation computation burden on a processor by assigning the correction value as a binary value.

19. A tangible computer readable storage medium comprising computer readable instructions that, when executed, cause a processor to at least:
retrieve, from a storage location via a network, a decision tree logic expression in a sum-of-products (SOP) form, the SOP form including first subexpressions having a logical OR relationship, the decision tree logic expression consuming a first duration to evaluate a dataset;
eliminate redundant variables of the decision tree logic expression by transforming the decision tree logic expression into a product-of-sums (POS) form, the POS form including second subexpressions having a logical AND relationship; and
evaluate the data set with the decision tree logic expression in the POS form, the decision tree logic expression in the POS form consuming a second duration to evaluate the data set that is less than the first duration.

20. A tangible computer readable storage medium as defined in claim 19, wherein the instructions, when executed, cause the processor to identify a first variable that is common to at least two of the first subexpressions.

21. A tangible computer readable storage medium as defined in claim 20, wherein the instructions, when executed, cause the processor to generate a simplified version of the transformed decision tree logic expression that factors out the first variable common to the at least two of the first subexpressions.

22. A tangible computer readable storage medium as defined in claim 19, wherein the instructions, when executed, cause the processor to identify surrogate variables associated with the transformed decision tree logic expression, the surrogate variables including a non-Boolean value.

23. A tangible computer readable storage medium as defined in claim 22, wherein the instructions, when executed, cause the processor to replace the non-Boolean value with a correction value when the non-Boolean value cannot be evaluated with an inequality test.

24. A tangible computer readable storage medium as defined in claim 23, wherein the instructions, when executed, cause the processor to reduce an evaluation computation burden on the processor by assigning the correction value as a binary value.

25. A method as defined in claim 1, further including determining branch occurrence rates for the decision tree logic expression in the POS form.

26. A method as defined in claim 25, further including ranking branches of the decision tree logic expression in the POS form by the branch occurrence rates.

27. A method as defined in claim 26, further including rearranging the branches of the decision tree logic expression in the POS form based on the ranking of the branches.

* * * * *